O. ZISTEL.
FISH CONVEYING AUTO.
APPLICATION FILED SEPT. 5, 1914.
1,227,732.
Patented May 29, 1917.
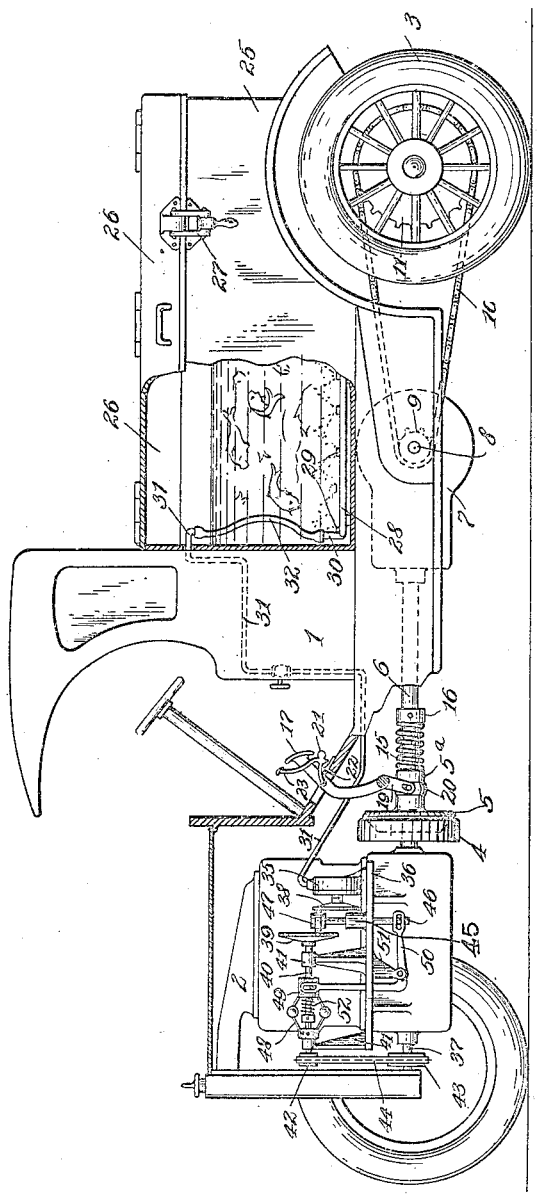

UNITED STATES PATENT OFFICE.

OSCAR ZISTEL, OF SANDUSKY, OHIO.

FISH-CONVEYING AUTO.

1,227,732. Specification of Letters Patent. Patented May 29, 1917.

Application filed September 5, 1914. Serial No. 860,336.

*To all whom it may concern:*

Be it known that I, OSCAR ZISTEL, a citizen of the United States, residing at Sandusky, in the county of Erie and State of Ohio, have invented a certain new and useful Improvement in Fish-Conveying Autos, of which the following is a full, clear, and exact description, reference being had to the accompanying drawings.

This invention relates to a contrivance for the transportation of live fish.

For many years it has been the practice of fish peddlers to pack uncleaned dead fish into carts and haul them about for hours, depending in warm weather, upon a limited supply of ice to keep the fish from spoiling. For the want of a modern and sanitary contrivance which would enable fish dealers to deliver fish alive and in a healthy condition, the public has been compelled to supply its wants from these unsanitary fish carts.

It is the general object of my invention, therefore, to provide a conveyance whereby live fish may be carried from place to place for any desired length of time and kept in a healthy condition by continually supplying air to the water which contains the fish, in the required quantity, regardless of the speed of the conveyance, or whether it is in motion or not.

By properly aerating the water, a great quantity of live fish may be accommodated in a comparatively small tank; and besides the very ready market which awaits live fish they demand a considerably higher price than dead ones.

I have illustrated an embodiment of my invention in the accompanying drawing, wherein the figure represents, in side elevation, a motor driven vehicle having my invention incorporated therein.

Referring to the drawing, 1 represents the vehicle, generally, and 2 the motor or engine whereby it is driven. The driving or propelling of the vehicle is accomplished through the rear wheels 3, as usual, and in the embodiment herein shown, the power is transmitted from the motor to the rear wheels through the clutch 4, 5, the driving shaft 6, suitable differential gearing inclosed in the casing 7 (the gearing being of any approved type, it being deemed unnecessary to show it, therefore), through the jack shaft 8, with its sprocket 9, to the chain 10, which passes over the sprocket 11 that is secured to the rear driving wheel 3. It will be understood, of course, that the sprockets 9 and 11, and the chain 10, are duplicated on the opposite side of the vehicle.

The clutch members 4 and 5 are shown as held in engagement by the spring 15 that surrounds the shaft 6 and is interposed between the rear end of the sleeve extension 5ª of said clutch member, and a collar 16 that is secured to the shaft 6. The clutch member 5 is shifted out of engagement with the member 4 by means of the pedal 17 that is pivoted at 18 and has a fork extension 19 that is operatively connected to the sleeve 5ª through the collar 20. By pressing the pedal 17 forward, the clutch member 5 will be moved rearwardly against the tension of the spring 15; and the parts may be held in this position by the engagement of the gravity pawl 21 with the abutment 22. The pawl may be dislodged from the abutment by the driver rocking his foot upon the pedal 17 until his toe engages the extension 23, and depressing the extension slightly. I have shown this as a convenient method of separating the driving connection between the motor 2 and the propelling or driving wheels 3, it being understood, however, that other means may be employed for the same purpose without departing from the spirit of my invention.

Situated upon the rear of the vehicle is the water tank 25 that is provided with covers 26 which are adapted to have their free edges clamped to the adjacent portion of the tank by means of suitable fastening devices, one of such devices being shown at 27. Located upon the bottom of the tank is an aerating device 28, which may be in the form of a tubular frame that is provided with a plurality of air distributers 29 and which has an inlet connection at 30. Such a device is shown in my copending application, Serial No. 836,081, filed May 4, 1914. The inlet 30 is connected to the end of an air supply pipe 31, by means of a flexible connector 32, which may consist of a length of rubber tubing that is slipped over the end of the connection 30 and the end of the pipe 31. This form of connection makes it very easy to remove the aerating device 28, for the purpose of cleaning the tank or draining the device.

Air is supplied to the aerating device from the pump 35 that is mounted upon a shelf 36, shown herein as supported from the side of the engine crank case. The pump 35 is of the rotary type, and is driven from the crank shaft 37 of the engine through mechanism which will now be described.

A disk 38 is secured to the shaft of the pump, and a similar disk 39 is carried upon the end of a shaft 40 which is supported by the brackets 41, from the shelf 36. This shaft 40 is operatively connected to the engine shaft 37 through the sprocket wheels 42 and 43 and the chain 44. The shaft 40 and the shaft of the pump 35 are in vertical alinement but are in different horizontal planes, as clearly illustrated. Guided within a hollow boss 45, which rises from the shelf 36, is a slidable post 46, which carries near its upper end, a transmission roller 47. The post 46 is in the common, vertical plane of the shaft 40 and the shaft of the pump 35, and is movable from the periphery of either disk to within a slight distance of its center. The movements of the post 46 are under the control of a governor 48, of ordinary form, that is located upon the shaft 40, the connections between the sliding sleeve 49 of the governor and the post 46, being through the bell crank 50 which is pivoted to a bracket 51 that depends from the lower surface of the shelf 36.

When the engine is running slow and the governor 48 is elongated through the influence of its spring 52, the bell crank 50 will be rocked so as to move the post 46 downward with the transmission roller 47 operating near the center of the disk 38 and being driven from near the periphery of the disk 39, a given speed being transmitted to the pump 35 while the parts are in this position. It will follow, therefore, that, as the governor responds to the centrifugal action of its weights, the sleeve 49 and the bell crank 50 will be moved in the opposite direction to elevate the post 46 and move the transmission roller 47 toward the periphery of the driven disk 38 and toward the center of the driving disk 39. This will result in the maintenance of the given speed of the pump, regardless of the increased speed of the engine.

The embodiment of my invention shown herein, is largely diagrammatic and conventional, and I do not limit myself to the construction illustrated and described, further than required by the terms of the annexed claims and the state of the prior art.

Having thus described my invention, what I claim is:—

1. Apparatus for transporting live fish comprising, in combination, a vehicle and a water tank carried thereby, a motor and vehicle propelling mechanism also carried by the vehicle, separable connections between the motor and said mechanism, a pump that is operatively connected to the motor, and means for conducting air from the pump to the water within the tank.

2. Apparatus for transporting live fish comprising, in combination, a vehicle and a water tank carried thereby, a motor and vehicle propelling mechanism also carried by the vehicle, separable connections between the motor and said mechanism, a pump that is operatively connected to the motor, mechanism whereby the relative speeds of the pump and the motor may be varied, and means for conducting air from the pump to the water within the tank.

3. Apparatus for transporting live fish comprising, in combination, a vehicle and a water tank carried thereby, a motor and vehicle propelling mechanism also carried by the vehicle, separable connections between the motor and said mechanism, a pump, means for conducting air from the pump to the water within the tank, and governor controlled driving connections between the pump and the motor shaft for maintaining a constant speed of the pump regardless of the variations in the speed of the motor.

In testimony whereof, I hereunto affix my signature in the presence of two witnesses.

OSCAR ZISTEL.

Witnesses:
BRENNAN B. WEST,
IRENE L. STOHLMAN.